Figure 1:
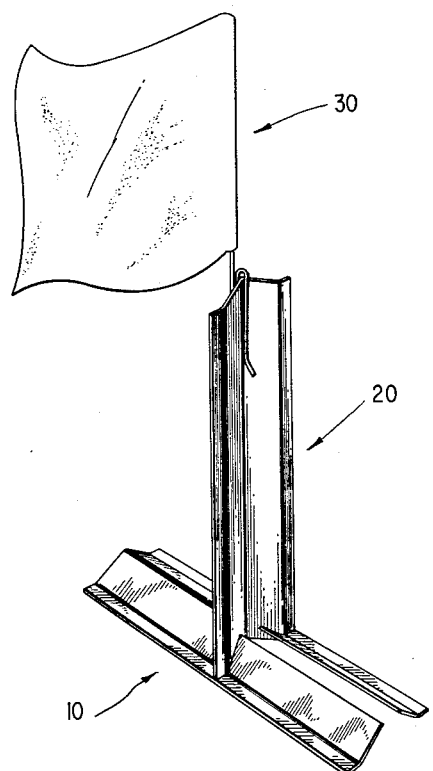

March 6, 1962 D. A. BOYD 3,023,725
HIGHWAY WARNING DEVICE
Filed Nov. 9, 1960 2 Sheets-Sheet 1

INVENTOR.
DON A. BOYD
BY
ATTORNEYS

March 6, 1962     D. A. BOYD     3,023,725
HIGHWAY WARNING DEVICE

Filed Nov. 9, 1960     2 Sheets-Sheet 2

INVENTOR.
DON A. BOYD
BY
*Jones, Birch, Swindler & McKie*
ATTORNEYS

United States Patent Office 3,023,725
Patented Mar. 6, 1962

3,023,725
HIGHWAY WARNING DEVICE
Don A. Boyd, 1124 Washington St.,
Aberdeen, S. Dak.
Filed Nov. 9, 1960, Ser. No. 68,176
9 Claims. (Cl. 116—63)

This invention relates to a warning device for use on roads and highways, and more particularly to a warning device which may be easily carried in a vehicle and placed on a road surface to provide a warning signal for vehicles on the road.

It is necessary and desirable that motor freight carriers and other types of road vehicles carry with them when in operation a signal device which, in the event of an emergency on the road, can be set up ahead of, behind, or at the side of a disabled vehicle. Such warning device must be characterized by ruggedness, simplicity and ease of use, and must be lightweight and compact so as to be easily carried in a glove compartment or other readily accessible space of a vehicle. Further, such warning device must comply with the requirements of Federal and local regulatory agencies as to size and visibility of the warning device, its weight, dimensions, and stability, when emplaced, and such similar features.

The object of this invention is to provide an improved road warning device.

Another object is to provide a road warning device which is compact, lightweight, rugged, simple, and readily visible on the highway.

Still another object is to provide a road warning device and storage means therefor which is easily demountable and compact for purposes of storage.

Still another object is to provide a road warning device with desirable characteristics of weight and dimension while complying with the requiremnets of general safety and with regulations of Federal and State authorities within the United States.

In accordance with one aspect of the invention, a base member and an upright member are formed of similar stock. Each member is of generally rectangular configuration, formed to curve about an axis along the longitudinal center, such that the portions of each member on either side of its central axis are inclined transversely toward one another. Since both members are identical in basic form, they may be nested one against the other in a knock-down condition for storage. The base and upright members are individually formed so as to permit an easy slidable mounting of the upright member perpendicularly with respect to the base. A flag is provided to be removably mounted atop the upright member in its assembled attitude. Front and back surfaces of the upright member are coated with a light-reflecting material. The warning device thus presents a signal visible in both daylight and darkness; the reflectorized surface on the upright member is visible in the headlights of passing automobiles at night, while the flag mounted atop the upright member provides an easily identifiable signal to daytime drivers.

The staff or rod supporting the flag is resilient intermediate its ends, so that the flag rod may be easily bent upon itself in a U configuration for compact storage in a knock-down condition. A storage means is provided, in accordance with the invention, which comprises a rectangular member of larger width and length than those respective dimensions of the base or upright member, so that the latter members can be nested and stacked upon the storage member. The storage member has means for retaining the disassembled parts of the warning device in place, while permitting their ready removal for assembly, yet is sufficiently compact to provide an easily handleable package for storage in a vehicle.

Figure 2:
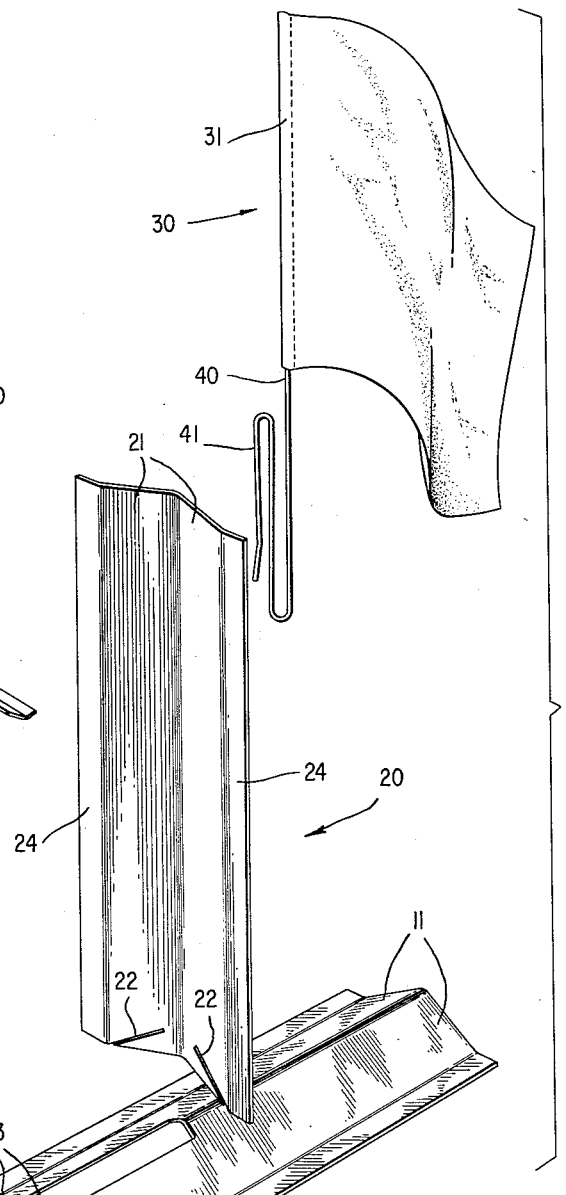
Figure 3:
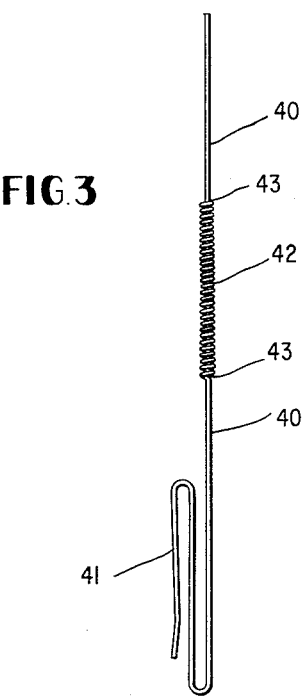
Figure 4:
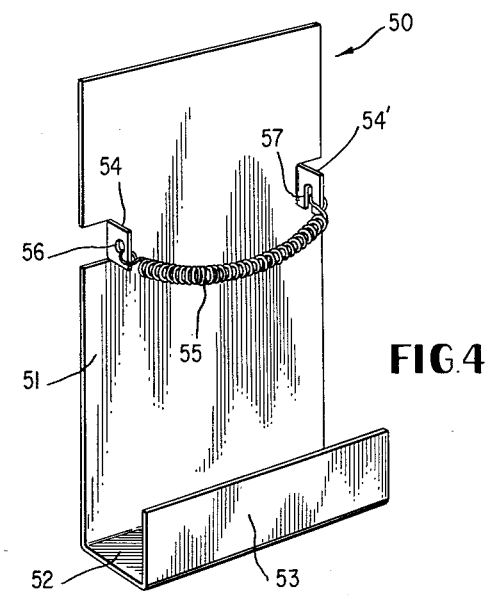
Figure 5:
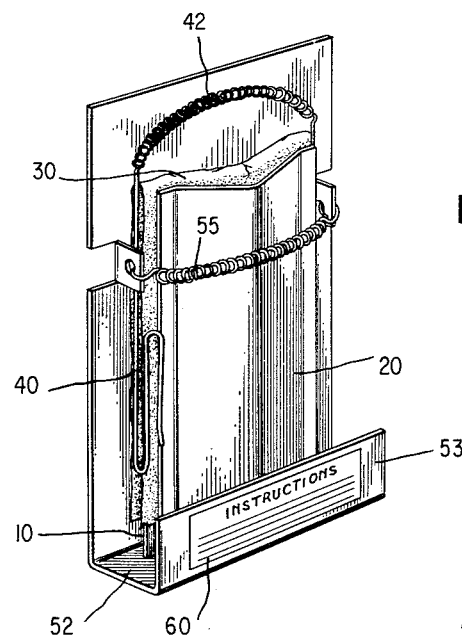

Further objects, features, and attending advantages of the invention will become apparent by reference to the following specifications and description:

FIGURE 1 is a perspective view of the warning device of the invention in its assembled condition, FIGURE 2 is an enlarged perspective exploded view of the major parts of the warning device of the invention, FIGURE 3 is an enlarged view of the flag-supporting rod of the invention, FIGURE 4 is an enlarged perspective view of the storage device of the invention, FIGURE 5 is an enlarged perspective view of the warning device of the invention disassembled and mounted for storage upon the device illustrated in FIGURE 4.

With reference to FIGURE 1, a base, generally indicated at 10 has mounted perpendicular to it an upright member generally indicated at 20. Mounted atop upright 20 is a flag generally indicated at 30.

With reference to FIGURE 2, base 10 is formed in a curve about a central longitudinal axis so as to form two longitudinal side portions 11. A slot or cut-out portion 12 is provided from one end of base 10 to a point intermediate the two ends, so as to form two tongues 13, longitudinally parallel to one another and inclined toward one another transversely. Upright member 20 is generally identical to base 10 in curvature and has transversely inclined lateral portions 21. There are provided adjacent the lower end of upright member 20 a pair of slots 22, which extend from the edge of the lower end upwardly and inwardly toward one another at an angle of inclination. These slots are so inclined that, if projected onto a plane parallel to the lateral or longitudinal edges of upright member 20, they would dscribe an angle of inclination corresponding to the angle at which tongues 13 of base 10 are inclined toward one another.

In the preferred embodiment, opposite side or lateral portions 11 of base 10 are provided with edge portions 14 which are formed so as to lie in the same plane with one another. This forming of the edges of base 10 provides good contact with a road surface when the warning device is emplaced. To insure proper nesting of base 10 and upright member 20, opposite lateral edges 24 of upright member 20 may similarly be formed so as to lie in the same plane.

With further reference to FIGURE 2, a flag 30 is carried by a staff or rod 40 having an S-shaped lower portion 41, permitting the flag and rod to be supported atop the upright member 20, as illustrated in FIGURE 1. By affixing rod 40 at the longitudinal center axis of upright member 20, the natural inclination of lateral portions 21 prevents flag rod 40 toppling to one side or the other.

Flag 30 has a sleeve portion 31 along one edge to removably receive rod 40. It will be understood that sleeve 31 is closed at the top to allow flag 30 to seat firmly upon rod 40.

With reference to FIGURE 3, rod 40 has a resilient portion 42 intermediate its ends. Resilient portion 42 may take any convenient form, but for purposes of illustration, is shown as a length of metallic spring, which can be crimped at its ends 43 upon the spaced rigid portions of rod 40, so as to form a unitary continuous rod, flexible in its center portion.

With reference to FIGURE 4, storage means, generally indicated at 50, is of generally rectangular configuration, and comprises a generally flat portion 51, and a base portion 52 formed perpendicularly to it. If desired, base portion 52 may be further formed with a portion 53 generally parallel to the plane of portion 51 and spaced from it. A pair of tabs 54, 54' are stamped from the stock of portion 51 at the opposite longitudinal edges thereof, and are preferably formed so as to lie perpendicular to flat portion 51. An expansible member 55 is attached to and extends between tabs 54, 54'. Expansible member 55 may be attached to one tab 54 as by a ring passing through an opening 56 in that tab. However, it is convenient to provide one tab 54' with an opening 57 which extends inwardly from the edge of that tab so as to permit the expansible member 55 to be easily attached thereto and removed therefrom. It will be understood that any means of ready attachment and detachment of the expansible member 55 may be used, whereas that shown is illustrative of a convenient form. Furthermore, expansible member 55 may be of any desired form—rugged, light, and resiliently expansible—but is herein illustrated as a mechanical spring.

With reference to FIGURE 5, there are shown the elements of the warning device disassembled and mounted for storage upon the device illustrated in FIGURE 4, thereby forming a warning device kit. Base 10 and upright member 20 are nested in face-to-face relation. Flag 30 may be conveniently folded and, to prevent scraping of the reflecting surface of upright member 20, all or a portion of the folded flag 30 may be arranged between the abutting surfaces of base 10 and upright member 20. Expansible member 55 is drawn across the face of stacked base and upright member and, being joined to tabs 54, holds the members firmly in place. Base portion 52 of the storage means 50 provides a locating and supporting surface for one end of the stacked elements of the warning device. Rod 40 is flexed about its resilient portion 42 so as to assume a U configuration, permitting opposite rigid portions of the rod 40 to be inserted between tabs 54, thereby rigidly holding rod 40 in place in the stacked assembly.

If desired, a set of instructions may be printed on a tag 60 or printed directly upon the portion 53 of the storage means 50.

In view of the foregoing, it will be seen that the invention thus described provides an improved highway warning device which is compact, simple, easily demountable and compact for purposes of storage. While any desired material may be used for the various elements of this invention, it is obvious that any material which may be formed into the elements described and which is lightweight, will provide a device which may be easily carried by a vehicle, and easily assembled in an emergency to provide an effective highway warning signal.

While the foregoing embodiment has been illustrated and described, it is apparent that various changes and modifications may be made in the construction and arrangement of the various parts without departing from the scope of the invention, so that invention is not to be considered limited to the preferred embodiment disclosed herein but rather only by the scope of the appended claims.

What I claim as new and desire to secure by Letters Patent of the United States is:

1. A warning device comprising a bifurcated base defining two spaced tongues parallel to one another longitudinally and inclined toward one another transversely, an upright member having upper and lower ends and lateral portions disposed at an angle to one another and provided adjacent said lower end with a pair of slots inclined toward one another, said tongues extending through said slots, a rod, a flag carried by said rod, and means for removably attaching said rod to said upper end.

2. The device of claim 1 having a reflective coating upon said upright member.

3. The device of claim 1 wherein said rod comprises a resilient portion intermediate the ends thereof and joining rigid portions thereof.

4. A warning device comprising a base having longitudinal side portions inclined at an angle transversely to one another and spaced transversely from one another along a portion of the length of said base extending from one end thereof, an upright member having an upper end, a lower end, and lateral portions, said lateral portions inclined at said angle transversely toward one another and provided with a pair of slots inclined toward one another and extending from said lower end; each of said longitudinal side portions along said portion of the length of said base passing through respective ones of said slots, a rod, a flag carried by said rod, and means for removably attaching said rod to said upper end.

5. The device of claim 2 wherein opposite edge portions of said longitudinal side portions are formed to lie in the same plane, and opposite edge portions of each of said lateral portions are formed to lie in the same plane.

6. The device of claim 5 wherein said resilient portion comprises a metal spring, and said means for removably attaching said rod comprises one of said rigid portions formed in an S-shaped bend.

7. A warning device comprising a base having longitudinal side portions inclined at an angle transversely to one another and spaced transversely from one another along a portion of the length of said base extending from one end thereof, an upright member having an upper end, a lower end, and lateral portions, said lateral portions inclined at said angle transversely toward one another and provided adjacent said lower end with a pair of slots inclined toward one another at such an angle that each of said longitudinal side portions along said portion of the length of said base may be removably inserted through respective ones of said slots, said longitudinal side portions and said lateral portions being of substantially equal width, whereby said base and said upright member may be nested in face-to-face relation.

8. A warning device kit comprising a base havnig longitudinal side portions inclined at an angle transversely to one another and spaced transversely from one another along a portion of the length of said base extending from one end thereof, an upright member having an upper end, a lower end, and lateral portions, said lateral portions inclined at an angle transversely toward one another and provided adjacent said lower end with a pair of slots inclined toward one another at such an angle that each of said longitudinal side portions along said portion of the length of said base may be removably inserted through respective ones of said slots, a rod having a resilient portion intermediate the ends thereof, a flag carried by said rod, means for removably attaching said rod to said flag, a substantially rectangular storage member having parallel longitudinal edges and a base portion perpendicular to one transverse edge thereof, a pair of tabs perpendicular to and formed from opposite ones of said longitudinal edges and spaced from one another by a distance greater than the respective widths of said base and said upright member, an expansible member removably attached between said tabs, said longitudinal side portions of said base and said lateral portions of said upright member being of substantially equal width whereby said base and said upright member may be nested in face-to-face relation and retained upon said storage means between said tabs by the action of said base portion and said expansible member.

9. A warning device comprising a longitudinally-extending base member having, in lateral cross-section, a pair of co-planar portions extending toward each other from outer surfaces thereof, and a pair of longitudinal side portions inclined at an angle toward each other and extending from said co-planar portions to a junction therebetween along a portion of their length but spaced apart along the rest of their length to define a cut-out portion, an upright member having an upper end, a lower end and lateral portions, said lateral portions being inclined at said angle transversely toward one another and provided adjacent said lower end with a pair of slots inclined toward one another at such an angle that each of said longitudinal side portions along said portion of their length may be removably inserted through respective ones of said slots, said longitudinal side portions and said lateral portions being of substantially equal width, whereby said base and said upright member may be nested in face-to-face relation.

References Cited in the file of this patent

UNITED STATES PATENTS

| | | |
|---|---|---|
| 884,950 | Page | Apr. 14, 1908 |
| 2,561,173 | Bompart | July 17, 1951 |
| 2,745,373 | Artese | May 15, 1956 |
| 2,794,414 | Reifschneider | June 4, 1957 |